Jan. 14, 1958   W. MOELTZNER ET AL   2,819,816
DEVICE FOR FEEDING WORK PIECES
Filed Dec. 16, 1952   2 Sheets-Sheet 1
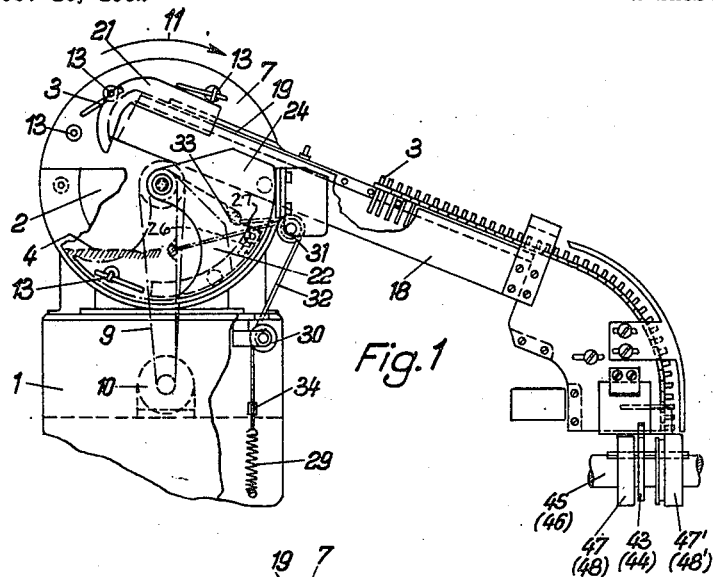
Fig.1
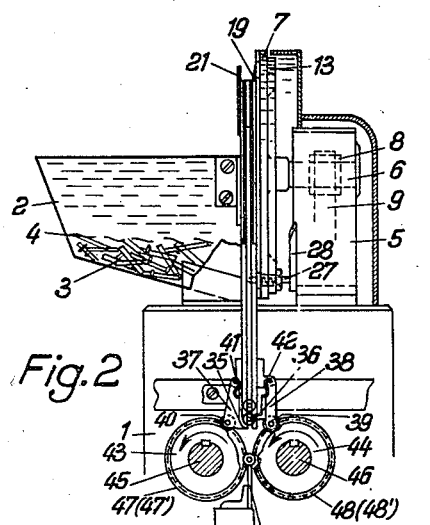
Fig.2
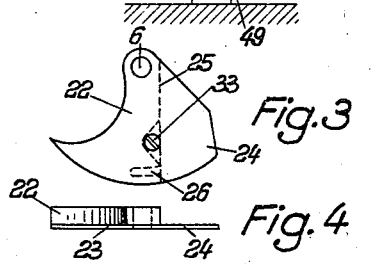
Fig.3
Fig.4
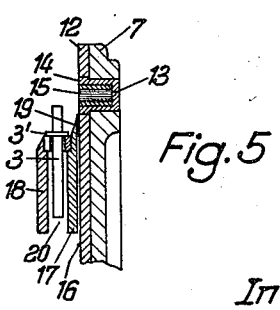
Fig.5
Inventors:
Wilhelm MOELTZNER
and
Johann HÜBL
by
Attorney Jan. 14, 1958  W. MOELTZNER ET AL  2,819,816
DEVICE FOR FEEDING WORK PIECES Filed Dec. 16, 1952  2 Sheets-Sheet 2

INVENTORS
WILHELM MOELTZNER
JOHANN HÜBL

BY *Strauch, Nolan & Diggins*
ATTORNEYS

United States Patent Office 2,819,816
Patented Jan. 14, 1958

2,819,816

DEVICE FOR FEEDING WORK PIECES

Wilhelm Moeltzner, Berlin-Charlottenburg, and Johann Hübl, Berlin-Halensee, Germany, assignors, by mesne assignments, to Landis Machine Company, Waynesboro, Pa., a corporation of Pennsylvania Application December 16, 1952, Serial No. 326,199

Claims priority, application Germany December 21, 1951

4 Claims. (Cl. 221—183)

For feeding work pieces consisting entirely or in part of magnetic material, electromagnets have been used which are arranged in and along the circumference of a divided disc or the like adapted to rotate in a vertical plane. The said electromagnets are intended to lift the work pieces out of a collecting container and automatically to release said work pieces into an inclined feeding trough. Each of the said electromagnets is provided with a rheostat, the sections of which are adapted with each revolution of the disc to advance automatically so that when the electromagnet is thrown in, first its total magnetic force becomes effective. Then, however, the electromagnetic force is decreased so that the electromagnet, when reaching its predetermined level, can hold only one single work piece and is adapted to transport only the said single work piece to the feeding point at which point the electromagnet is switched off.

Such a device, however, is, due to the necessary control of the electromagnets, rather cumbersome and not suitable for bulky work pieces inasmuch as the poles of the electromagnets are arranged on the periphery of the discs. The result of such an arrangement is that the feeding trough must be arranged tangentially with regard to the disc so that the work pieces in longitudinal direction thereof will slide through this feeding trough after the electromagnet has been switched off and finally can be piled up in a magazine one on top of the other. The work pieces can then be discharged from the magazine at the lower end thereof. Such a tangential feeding trough cannot be used in connection with long bulky work pieces, such as bolts or pins provided with a head or collar, because the work pieces provided with a collar cannot be piled up one on top of the other prior to further machining operations. Therefore, such work pieces have heretofore successfully been fed into an inclined feeding trough provided with a slot in which the work pieces are suspended by their heads and slide downwardly in order to be fed to the working stations. Such a feeding trough which is particularly suitable for long bolts with collars or for similar work pieces could heretofore not be used in connection with magnetic feeding devices.

It is, therefore, an object of this invention to provide a feeding device for feeding work pieces which will overcome the above mentioned drawbacks.

It is another object of this invention to provide a magnetic feeding device for work pieces which will be able to feed bulky work pieces as well as work pieces provided with a flange or collar into a feeding trough.

It is also an object of this invention to provide a magnetic feeding device including a disc provided with magnetic poles which will make it possible to arrange a feeding trough in cooperation with said disc so that one of the lateral walls of said trough will be located in that plane of said disc in which said magnetic poles are located.

A still further object of this invention consists in the provision of a magnetic feeding device, in which a feeding disc will have associated therewith means for loosening the work pieces to be picked up from a collecting container.

These and other objects and advantages of the invention will appear more clearly from the following specification in connection with the accompanying drawings in which:

Fig. 1 illustrates a side view of a feeding arrangement according to the present invention.

Fig. 2 is a view of Fig. 1 as seen from the right side of Figure 1.

Fig. 3 shows a view of a scoop for use in connection with the arrangement shown in Fig. 1.

Fig. 4 is a top view of Fig. 3.

Fig. 5 represents a longitudinal section through the feeding disc of Fig. 1 and a magnet as well as through a portion of the feeding trough operating therewith.

Figure 6:
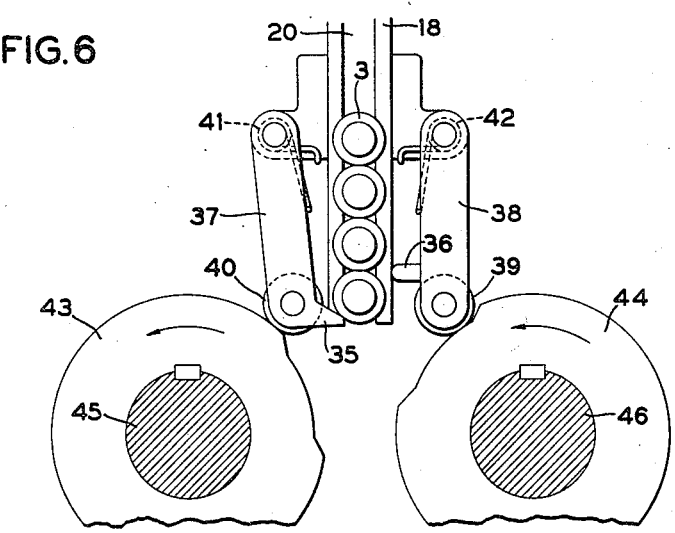
Fig. 6 is an enlarged elevation of the mechanism for controlling the delivery of the work pieces to the thread rolling dies.
Figure 7:
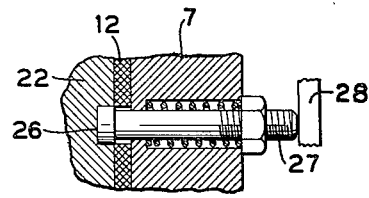
Fig. 7 is an enlarged fragmentary view of a mechanism for operating the scoop shown in Figure 3.
Figure 8:
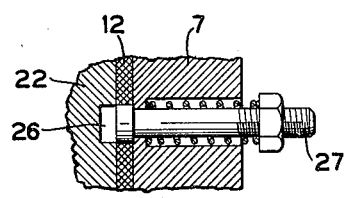
Fig. 8 is a view similar to Figure 7 showing the parts in a different position.

One of the primary features of the present invention consists in that the feeding disc has arranged therein magnets, preferably permanent pot-shaped magnets, the poles of which are located in the plane of the disc. This arrangement of the magnets makes it possible to arrange one side wall of the feeding trough in that plane of the disc in which the magnet poles of the disc are located, the edges of those side wall portions which form the upper portion of the slot for guiding the work pieces, preferably being located at the upper half of the disc within the circle in which the magnets are located.

The advantage of such a feeding arrangement consists in that also bulky work pieces can be arranged adjacent the disc and can be lifted off the surface of the work pieces in the collecting container in order to be fed into the inclined feeding trough in suspended position. According to the invention, short, compact, permanent, pot-shaped magnets can be built into the disc so that they will be parallel to the axis of rotation of said disc. The advantage derived therefrom consists in that a disc will be obtained, both sides of which are completely smooth so that the disc can revolve freely in a filled collecting container one wall of which is formed by said disc. This arrangement has the further advantage that large bulky work pieces can be fed to the working station without any disturbances.

According to a further feature of the invention, a scooping device may be provided for cooperation with the disc carrying the magnets, which scooping device is effective in the plane of the disc and is adapted with each revolution of the disc to effect a reciprocating movement. To this end the disc has advantageously connected thereto a spring urged pin extending through said disc and adapted to move on a cam arranged on the backside of said disc. The front end or dome of said pin is in its outermost position located substantially in the plane of said disc and when engaging the cam protrudes from said plane and carries along a scoop against the thrust of a retraction spring, said scoop being journalled on the shaft of said disc. In this way, the work pieces of the collecting container will continuously be loosened, which is of particular advantage in connection with bulky work pieces.

In order to feed the work pieces individually in suspended position into the feeding trough, the upper end of said trough is provided with a guiding member located within the radius of action of said magnets and adapted to align the work pieces carried along. With thread rolling machines or other machine tools which machine the work pieces in succession after each respective revolution of the machine tool rollers, for instance thread rollers, it is advantageous to make the release or picking up of the work pieces from the feeding trough dependent on the rotation of the tool. To this end, the lower end of the feeding trough is provided in a manner known per se with a stopping device carrying the reciprocating blocking noses, while the control members for the blocking noses carry rollers adapted to engage cams, said cams being co-axially arranged with regard to the machine tool rollers (thread rollers) and being adapted during the revolution of the machine tool rollers to actuate the control members for the blocking noses.

Referring now to the drawings in detail, the structure shown therein comprises a frame 1 which carries a collecting container 2 (which up to the dotted line 4 is filled with work pieces 3 to be machined). Connected to the frame 1 is a bearing block 5 in which the shaft 6 of the feeding disc 7 is journalled. The shaft 6 has connected thereto a pulley 8 which is driven by an electric motor 10 through a belt 9, said motor 10 being mounted on the frame 1. The direction of rotation of the feeding disc 7 is indicated by the arrow 11.

Preferably, the feeding disc 7 is made of a light metal alloy and has its front side lined with a disc 12 made of hard pressed material. The disc 7 carries a plurality of circularly arranged and evenly distributed permanent pot-shaped magnets 13, the poles 14 and 15 of which are located in the plane 16 of the disc 12 or 7. The feeding trough 18 has the outer surface of that side wall 17 thereof which faces the disc 7 located in the plane 16 so that it will lightly touch the surface of the disc 12. The side wall 17 has within the range of the disc 7 a wedge shaped bevel 19 which is adapted to strip off the work pieces 3 carried along by the magnets 13. As will be clear from Fig. 5, the work pieces are suspended in the slot 20 of the feeding trough 18, while the collar 3' rests on the upper edge of the feeding trough so that the work pieces in suspended position slide downwardly on the inclined track as has been illustrated in Fig. 1. The upper end of the feeding trough 18 is provided with a guiding member or guiding piece 21 located within the radius of action of the magnets 13 to thereby bring about an aligning of the work pieces carried along. More specifically the work pieces carried along by the disc 7 enter the guiding member 21 and are aligned with regard to the slot 20 whereupon by means of the bevel 19 they are stripped off at the feeding trough.

Rockably mounted on the shaft 6 is a scoop 22 which, according to the embodiment shown in Figs. 3 and 4, has the shape of a sickle and on its outside carries a cover sheet 23, the part 24 thereof protruding on one side. The said scoop is so arranged that in raised position of the scoop according to Fig. 1, the said cover sheet 23 will be adjacent the outside of the feeding trough 18 in order to prevent any work pieces, which might miss the feeding trough, from being clamped therebetween. The scoop 22 is provided with a recess 26 which extends from its edge 25 and is adapted to be engaged by the spring urged pin 27 when said pin engages the cam 28 which is connected to the bearing block 5. The portion of the scoop projecting into the mass of work pieces in the collecting container 2 may be termed a pickup portion. The pin 27 is arranged in the disc in such a manner that it penetrates the disc, the front end or dome of said pin, when the spring or said pin is in released position, being substantially located in the plane of the disc 7. When the pin 27 engages the cam 28, it protrudes from said disc 7 and against the thrust of the retraction spring 29 carries along the scoop 22 during the turning movement of the disc and for the period during which said cam is engaged by said disc. This retraction or restoring spring 29 is mounted on the frame 1 and is connected with the scoop 22 through the intervention of a cable 32 passing over rollers 30, 31 and a screw 33. The pulling force of the spring can be varied by the adjusting device 34.

The scoop carries out an oscillating movement with each rotation of the disc 7 and the pickup portion thereby loosens the work pieces 3 in front of the disc 7. The two end positions of the scoop are illustrated in Fig. 1 in full lines and dot-dash lines respectively.

The lower end of the feeding trough 18 is provided with a stopping arrangement comprising reciprocating blocking noses 35, 36. The control members for the blocking noses are designated with reference numerals 37, 38 and carry rollers 39 and 40. Both control members have restoring springs 41 and 42 which press the rollers 39 and 40 against the cam discs 43 and 44. These cam discs are mounted on the working spindles 45 and 46 which carry the thread rollers 47, 47' and 48, 48'. The work piece support located between the rollers is designated with the reference numeral 49.

With each rotation of the thread rollers, the cam discs 43 and 44 impart a reciprocating movement upon the blocking noses 35 and 36 as a result of which, with each rotation of the rollers, one work piece is released from the feeding trough and arrives at the work piece support on which it is machined, by the thread rollers. When shorter roller distances are involved, it is also possible to use a cam disc which is designed so that during one revolution of the thread rollers more than one work piece is released. For instance, during one rotation of the thread rollers two or three work pieces may be machined in succession and accordingly, in the same working cycle, two or three work pieces will automatically be released from the feeding trough.

The feeding device, according to the present invention, may be used for numerous purposes and is particularly suitable in connection with machine tools in which the work pieces are successively fed to the working station. The arrangement according to the invention has particular advantages in connection with thread rolling machines inasmuch as it makes it possible to arrange the end of the feeding trough directly between the two thread rollers while the release of the work pieces from the feeding trough may be controlled in accordance with the rotation of the machine tool rollers.

The feeding device provided with permanent magnets in conformity with the present invention is particularly suitable for feeding long bulky work pieces, for instance, bolts or pins with head or collar which are machined on thread rolling or similar machine tools.

It is of course understood that the present invention is, by no means limited to the particular embodiment shown in the drawings, but also comprises any modifications within the scope of the appended claims.

What we claim is:

1. In a feeding device for feeding work pieces of at least partly magnetic material to a feeding station, the combination of: a disc arranged to rotate in a vertical plane, magnetic means carried by said disc and having the magnetic poles thereof arranged substantially in the plane of one of the major surfaces of said disc, a work piece collecting container arranged adjacent said disc so as to allow said disc to enter said container for picking up work pieces therefrom, scooping means arranged to enter said container and mounted for rocking movement about the axis of rotation of said disc, said scooping means being provided with a recess, spring urged pin means carried by said disc, one end of said pin means normally being located in substantially the plane of said one major disc surface, and the other end of said pin means normally protruding from the other major disc surface, cam means arranged adjacent said other major disc surface and adapted for a predetermined angle of rotation of said disc to cause said pin means to enter said recess and to carry along said scooping means and subsequently to release the same, restoring spring means operatively connected to said scooping means for returning the same to its normal position following the release of said scooping means, and work piece conveying means arranged adjacent said disc to receive work pieces released therefrom.

2. A feeding device according to claim 1, which includes a frame carrying said collecting container and said restoring spring means, and which also includes roller means and cable means passing over said roller means and interconnecting said scooping means and said restoring spring means.

3. In a device for removing work pieces from a container, a disc arranged to rotate in a substantially vertical plane, at least the lower portion of said disc extending into said container, magnetic means carried by said disc and having the magnetic poles thereof arranged substantially in the plane of one face of said disc and radially spaced from the axis of rotation of said disc, a scoop mounted for rocking movement about the axis of said disc closely adjacent said one face of said disc, said scoop having a pickup portion extending into said container opposite the path of the poles of said magnets as they pass through said containers, scoop return means constantly yieldably urging said scoop in a direction counter to the direction of the rotation of said disc, and means carried by said disc for periodically overcoming the resistance of said scoop return means and positively rocking said scoop in the direction of rotation of said disc to separate said work pieces and to load said work pieces on said magnetic means.

4. In a device for removing work pieces from a container, a disc arranged to rotate in a substantially vertical plane, at least the lower portion of said disc extending into said container, magnetic means carried by said disc and having the magnetic poles thereof arranged substantially in the plane of one face of said disc and radially spaced from the axis of rotation of said disc, a scoop mounted for rocking movement about the axis of said disc closely adjacent said one face of said disc and having a pickup portion extending into said container opposite the path of said magnetic poles as they pass through said containers, scoop return means constantly yieldably urging said scoop in a direction counter to the direction of rotation of said disc, a plunger mounted on said disc, and means for periodically advancing said plunger into contact with said scoop to carry said scoop with said plunger against the resistance of said scoop return means and thereby positively rock said scoop in the direction of rotation of said disc to separate said work pieces and to load said work pieces on said magnetic means.

References Cited in the file of this patent

UNITED STATES PATENTS

| | | |
|---|---|---|
| Re. 13,461 | Kingston | Aug. 27, 1912 |
| 535,972 | Wooster et al. | Mar. 19, 1895 |
| 643,973 | Painter et al. | Feb. 20, 1900 |
| 644,279 | Couch et al. | Feb. 27, 1900 |
| 917,359 | Read | Apr. 6, 1909 |
| 1,008,032 | Hastings | Nov. 7, 1911 |
| 1,330,639 | Leumann | Feb. 10, 1920 |
| 1,358,725 | Gaynor | Nov. 16, 1920 |
| 1,952,777 | Raymond | Mar. 27, 1934 |
| 2,596,109 | Abbott | May 13, 1952 |